April 7, 1970  J. E. FARMER  3,504,731
BATTERY ELEMENT FABRICATING MACHINE
Filed June 29, 1967  14 Sheets-Sheet 1

Inventor:
John E. Farmer
By: Hofgren, Wegner, Allen,
Stellman & McCord
Attorneys April 7, 1970   J. E. FARMER   3,504,731

BATTERY ELEMENT FABRICATING MACHINE

Filed June 29, 1967   14 Sheets-Sheet 4

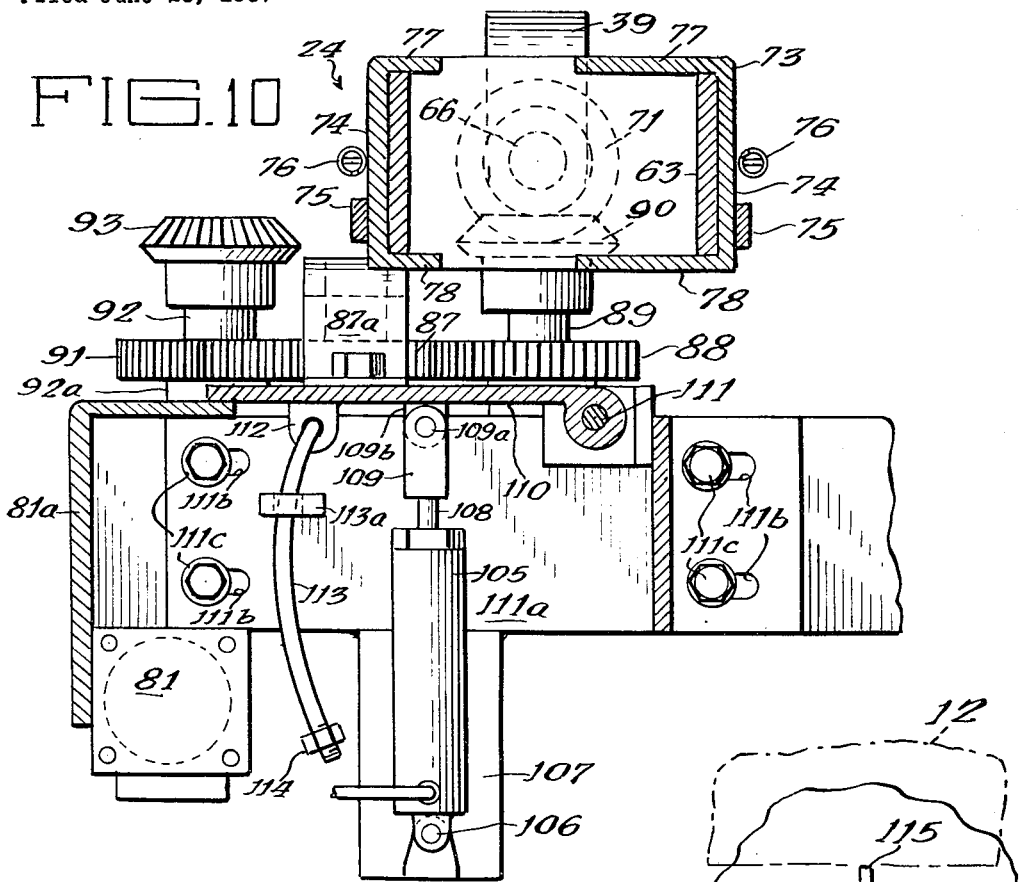
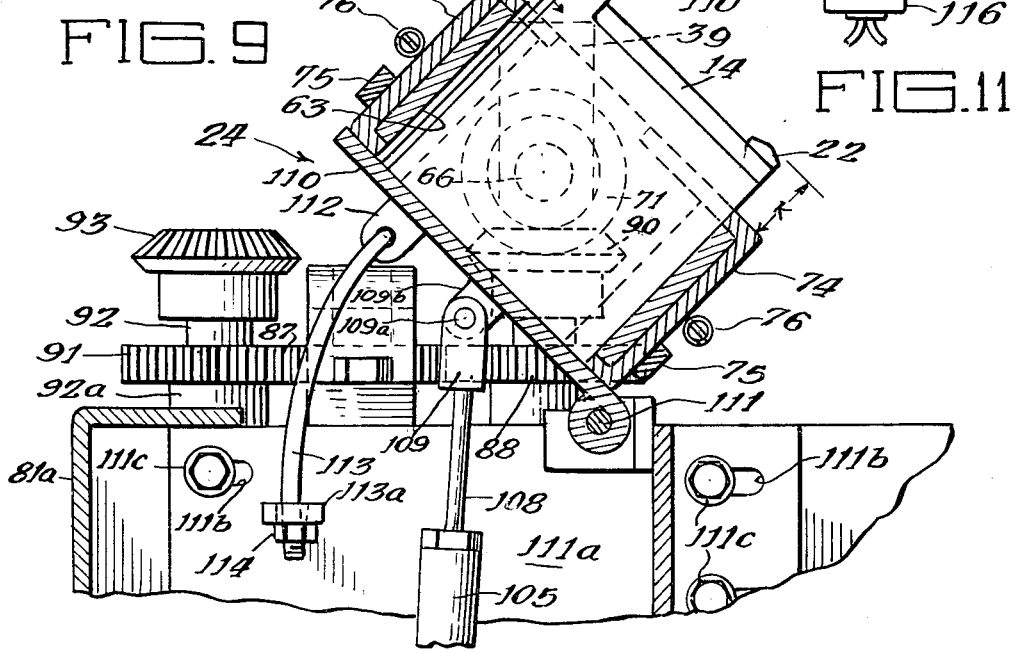

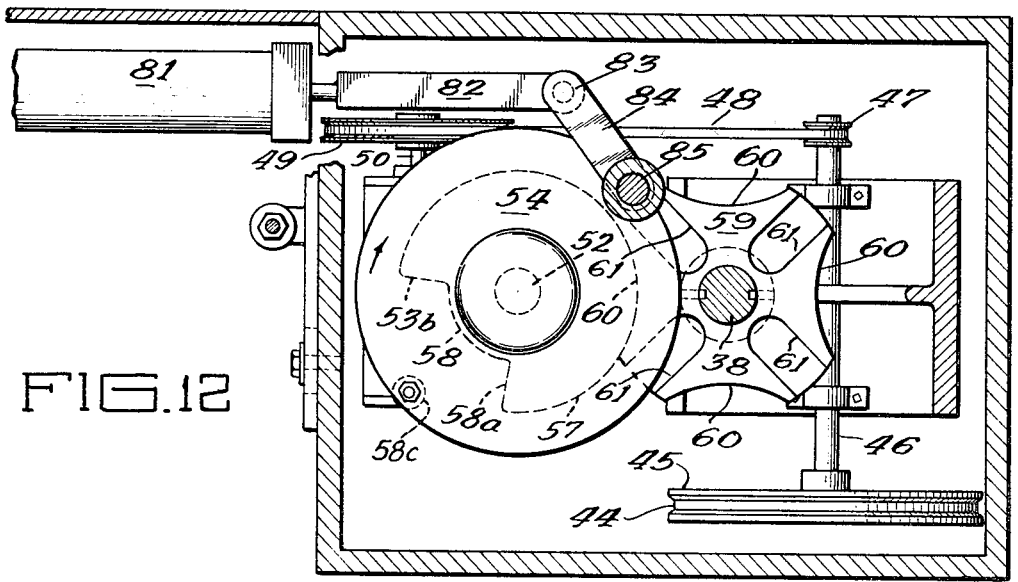

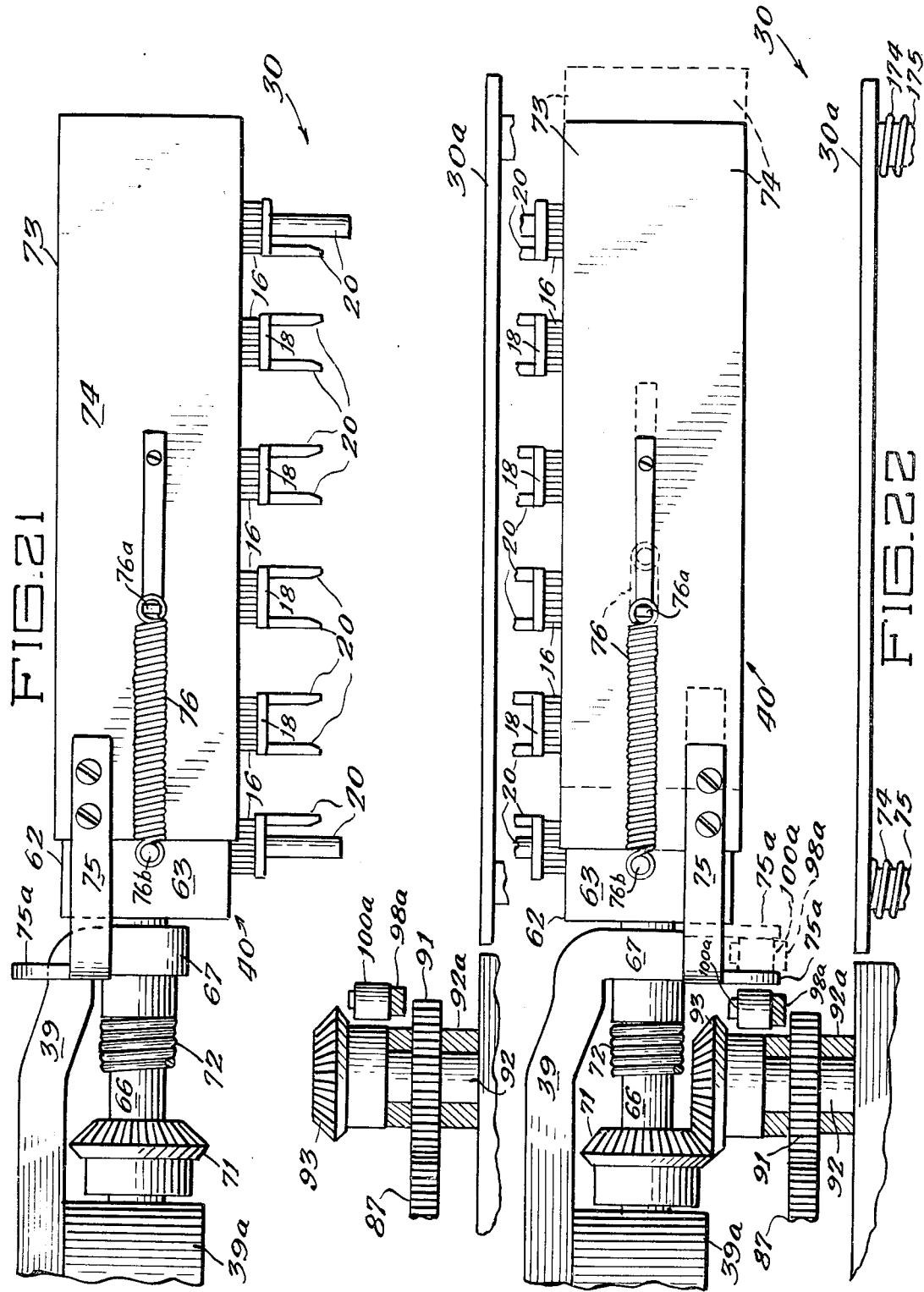

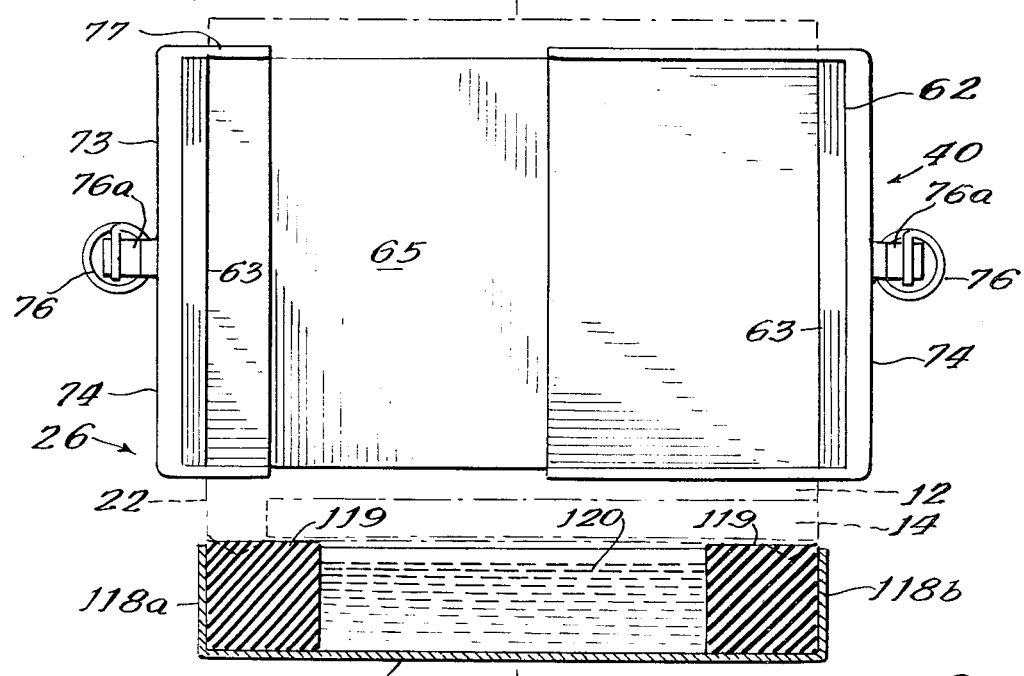
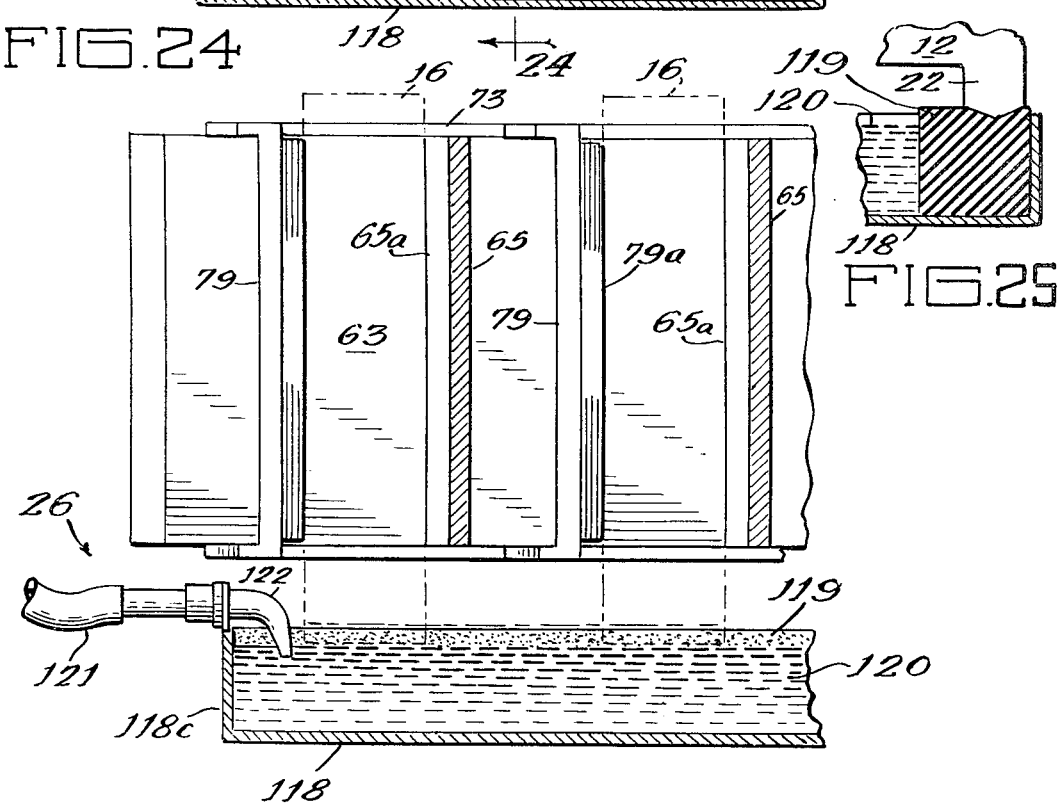

FIG.26
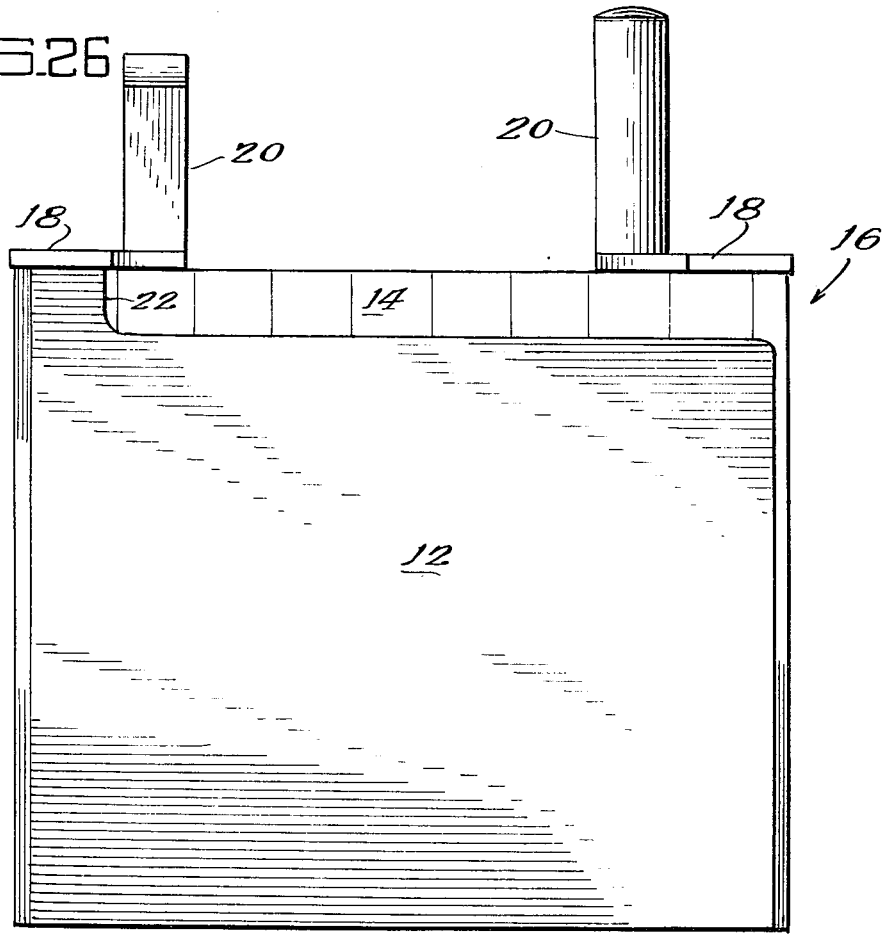
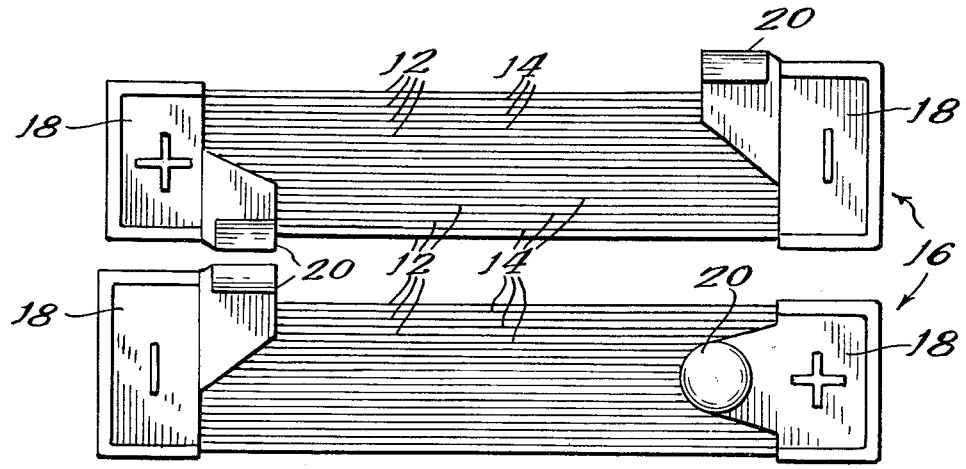
FIG.27

United States Patent Office 3,504,731
Patented Apr. 7, 1970

3,504,731
BATTERY ELEMENT FABRICATING MACHINE
John E. Farmer, Chicago, Ill., assignor to Farmer Mold and Machine Works, Inc., a corporation of Illinois
Filed June 29, 1967, Ser. No. 650,119
Int. Cl. B22d 19/00
U.S. Cl. 164—270                     21 Claims

ABSTRACT OF THE DISCLOSURE

A machine for assembling battery plates and separators into groups by the cast-on method of forming posts and straps on the plates. The machine has a central vertically movable and rotatable column with a plurality of radially outwardly extending plate holding baskets, each of which is rotatably connected to the column and movable therewith between a loading station wherein battery plates are loaded with the basket angularly oriented with respect to horizontal and wherein the plates are loaded with the lugs of the plates projecting upwardly therefrom; a fluxing station; a molding station wherein particular valve means are provided to permit rapid and accurate flow of molten lead into cavities for the formation of battery posts and straps on the lugs of the plate; and an unloading station.

BACKGROUND OF THE INVENTION

Field of the invention

This invention relates to machines for assembling storage battery elements and more particularly to a machine for assembling storage battery elements by the cast-on method of forming posts and straps on the lugs of battery plates.

Description of the prior art

Until recently, the common method for assembling posts, straps and plates of a storage battery has been by the so-called "burning" process. Simply stated, this meant that the post was cast separately and then welded to the strap produced by melting the lugs on the plates of the battery. Recently the socalled "cast-on" method of battery assembly has come into use. By this method, the lugs of the battery plates are dipped into a mold cavity containing molten lead so that the straps and posts are fused to the lugs. When the molten lead is cooled, the adhered straps and posts are withdrawn from the mold cavity. Mechanisms for carrying out this method have been disclosed in Vieth Patent No. 2,799,905, issued July, 1957, and Sabatino et al., Patent No. 3,253,306, issued May 31, 1966.

Vieth Patent No. 2,799,905 discloses a battery assembling machine for assembling plates by the cast-on method of welding wherein a single hopper is mounted on a single arm which is movable from a loading station to a casting station and then to an unloading station. At the loading station, the plates are loaded with the lugs projecting downwardly, and structural means are provided for aligning the plates. In addition, the Vieth patent discloses separate means at the unloading station for vibrating the battery plates to settle the same. Finally, the Vieth patent uses a motive means for rotating the arm on which the hopper is mounted and a separate motive means for vertically moving the central column to which the arm is attached between the stations in the path of travel of the arm.

Sabatino et al., Patent No. 3,253,306 discloses a battery assembly machine including a central column which is rotatable between a plurality of operating stations. The column has outwardly projecting arms at the end of which there are traversely oriented battery plate gripping means. The gripping means are vertically movable with respect to the arms and rotatable or swingable with the arms to move between the several stations as the central column moves and rotates in the operation of the mechanism. At the loading station of the Sabatino apparatus, a separate means is provided for aligning the plates and separator elements prior to being picked up by the gripper means at the ends of the arms. This separate aligning or preloading means is disclosed and claimed in Sabatino et al., Patent No. 3,294,258, issued Dec. 27, 1966. The separate loading and aligning means includes a box-like member into which the battery plates are stacked with the lugs facing downwardly. Structural means are provided for settling the plates in order to insure alignment thereof. The box-like member is then partially rotated to be placed in a position wherein the plates can be extracted therefrom by the plate gripping means on the free ends of one of the arms of the battery assembly machine.

At the fluxing station of the structure shown in the Sabatino et al., 3,253,306 patent, a means is provided for heating the lugs of the plates in order to prepare the plates for the molding station. At the molding station, molten lead is supplied to the cavities by dipper elements which dip into a reservoir and move towards the cavities to pour a specified amount into the cavities, withdraw, dip, and move into pouring position and so on.

Other patents which deal with the method of cast-on molding of straps and posts to the lugs of battery plates are the Sabatino et al., Patent No. 3,087,005, issued Apr. 23, 1963; Sabatino et al., Patent No. 3,229,339, issued Jan. 18, 1966; Sabatino et al., Patent No. 3,238,579, issued Mar. 8, 1966 and Bronstert Patent No. 3,072,984. Generally speaking, all of these patents deal with the method for improving the fusion between the cast strap and post and the lugs on the battery plates and have little to do with disclosing structure for accomplishing the method.

SUMMARY OF THE INVENTION

This invention is directed, in brief, to the provision of a machine for assembling the plates and separators of a battery by the cast-on method wherein the machine is provided with a central vertically movable column having radially outwardly extending battery plates holding hoppers or baskets which are mounted for rotation with respect to the column. The column is also rotatable to move the baskets between a loading station, fluxing station, molding station and unloading station. At the loading station, the baskets are rotated on their axes so as to be angularly oriented, and the battery plates are loaded with the lugs up, alignment of the plates being automatically accomplished thereby. At the fluxing station, the battery plates are dipped into the flux and no separate means is necessary for heating the flux or heating the lugs of the plates. At the molding station, novel valving means is provided for accurately supplying a flow of molten lead in a predetermined amount to the mold cavities.

BRIEF DESCRIPTION OF THE DRAWINGS

FIGURE 9 is a fragmentary enlarged section view taken generally along the line 9—9 of FIGURE 1 showing the disposition of the elements of the machine at the loading station in a condition to receive battery plates to be loaded therein with the lugs facing upwardly;

FIGURE 10 is a view similar to FIGURE 9 but showing the elements of the loading station prior to being placed in a condition to receive the battery plates for stacking;

FIGURE 11 is a fragmentary enlarged section view of a portion of the loading station;

FIGURE 12 is a fragmentary section view taken generally along the line 12—12 of FIGURE 4;

FIGURE 13 is a fragmentary enlarged section view taken generally along the line 13—13 of FIGURE 4;

FIGURE 21 is a fragmentary enlarged elevational view of the unloading station of the machine with the central column in the raised position for rotating the plate holding carrier to the unloading station with the battery lugs, straps and posts facing downwardly;

FIGURE 22 is a view similar to FIGURE 21, but with the center post having been retracted so that the gears on the carrier supporting arm are in meshing engagement with a gear for rotating the carrier 180° from the position shown in FIGURE 21, prior to the unloading of the battery groups from the carrier, by relative movement of the side walls of the carrier to the dotted outline position, to permit the gravity fall of the battery groups held therein;

FIGURE 23 is an enlarged end view of the fluxing station showing the carrier positioned with the battery lugs oriented downwardly into absorbing engagement with flux saturated sponge elements;

FIGURE 24 is a fragmentary section view taken generally along the lines 24—24 of FIGURE 23;

FIGURE 25 is a fragmentary section view showing in greater detail the relationship between the lugs of the battery plates and the flux supplying means of the fluxing station;

FIGURE 26 is an elevational view of a completed group of battery plates and spacers held together by cast-on straps having upwardly projecting posts; and FIGURE 27 is a top plan view of two such completed groups as assembled by the battery assembling machine of this invention.

DESCRIPTION OF THE PREFERRED EMBODIMENT

Figure 1:
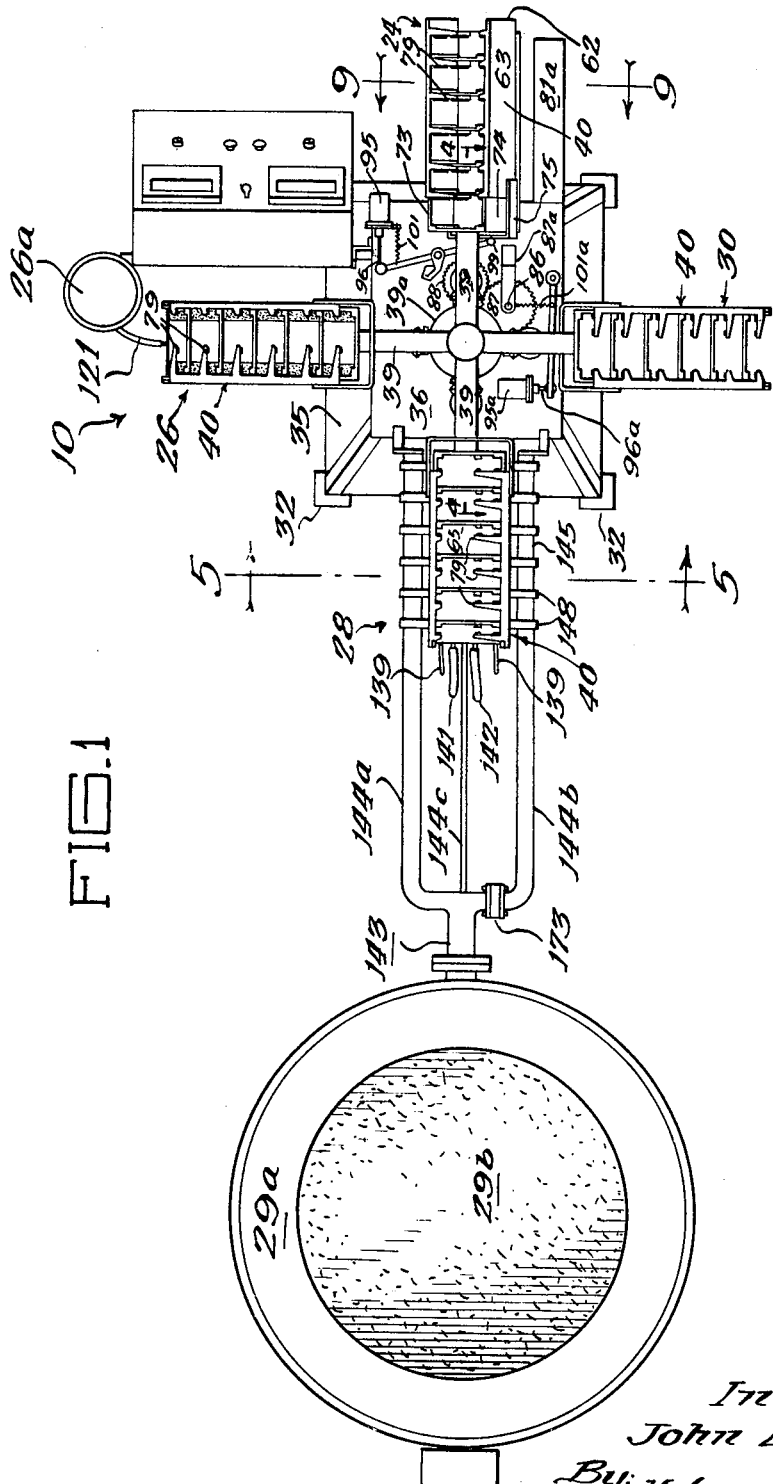
FIGURE 1 is a top plan view of the battery element fabricating machine of this invention.

The battery element fabricating or battery element assembly machine 10 of this invention is intended for use in joining a number of battery plates 12 for use in the cells of a storage battery. As best seen in FIGURES 26 and 27, plates 12 and separators 14, are assembled into groups 16 by forming straps 18 and posts 20 on the lugs 22 of the plates. This machine is intended for use in forming such straps and posts on the lugs to produce the groups by the cast-on method. Generally battery plates 12 are grid-like structures with a lug 22 projecting outwardly along one side at the top of the plate as shown in more detail in Sabatino et al., Patent No. 3,249,981. For simplicity of illustration, the plates are shown herein as being solid, but it is to be understood that in actual practice, the plates are grids with an electrolytic activated paste bonded to the grids.

Generally speaking, the battery element fabricating machine 10 includes a loading station 24 wherein the plates and separators are loaded; a fluxing station 26 wherein flux from a fluxing pot 26a is applied to the lugs of the plates; a casting station or molding station 28 wherein molten lead 29 is fed by pressure flow from a leadvat 29a, and cast on the previously fluxed lugs 22; and an unloading station 30 wherein the completed groups 16 are dropped onto a shelf 30a or other suitable surface from which the group 16 may be carried to be installed in a battery casing. Typically a scum 29a of lead oxide continually floats on the top of the molten lead 29 and serves as a shield to maintain the molten lead relatively pure.

The machine 10 is provided with a frame including a plurality of upright legs 32 and a base 33. Housing means generally encloses the frame including a pluarlity of side panels 35 and a top cover panel 36. The machine is provided with a central column 38 which is both vertically movable with respect to the frame and rotatable as well. Arms 39 extend radially outwardly from a hub 39a connected to the top of column 38. Each arm 39 supports hoppers or baskets or group carriers 40 that extend radially outwardly from the arms and are adapted for holding the battery plates and separators as the several operations are performed at the different stations. The carriers 40 are rotatable relative to the arms 39 and the arms are movable with the column 38. The carriers rotate about an axis generally coextensive with each arm 39.

MAIN DRIVE SYSTEM

The central column 38 is vertically and rotatably driven by a drive system working primarily off a Geneva motion, and is best seen in FIGURES 4 and 12 through 14.

Column 38 is mounted for rotation and for vertical movement in a sleeve-like member 41. A motor 42 is connected to the base 33 of the frame and drives a pulley 43 about which is reeved a drive belt 44. Drive belt 44 is also reeved about a large drive pulley 45 which is connected to a rotatable shaft 46. On the opposite end of the shaft 46 is a small pulley 47 which drives a belt 48 also reeved about an intermediate size pulley 49. Pulley 49 is connected to a shaft 50 which extends into gear housing 51. Suitable gearing (not shown) in housing 51 transmits the motive force from the rotation of shaft 50 to rotate the uprightly extending cam drive shaft 52 through 360° to rotate central column 38 through 90°.

Figure 4:
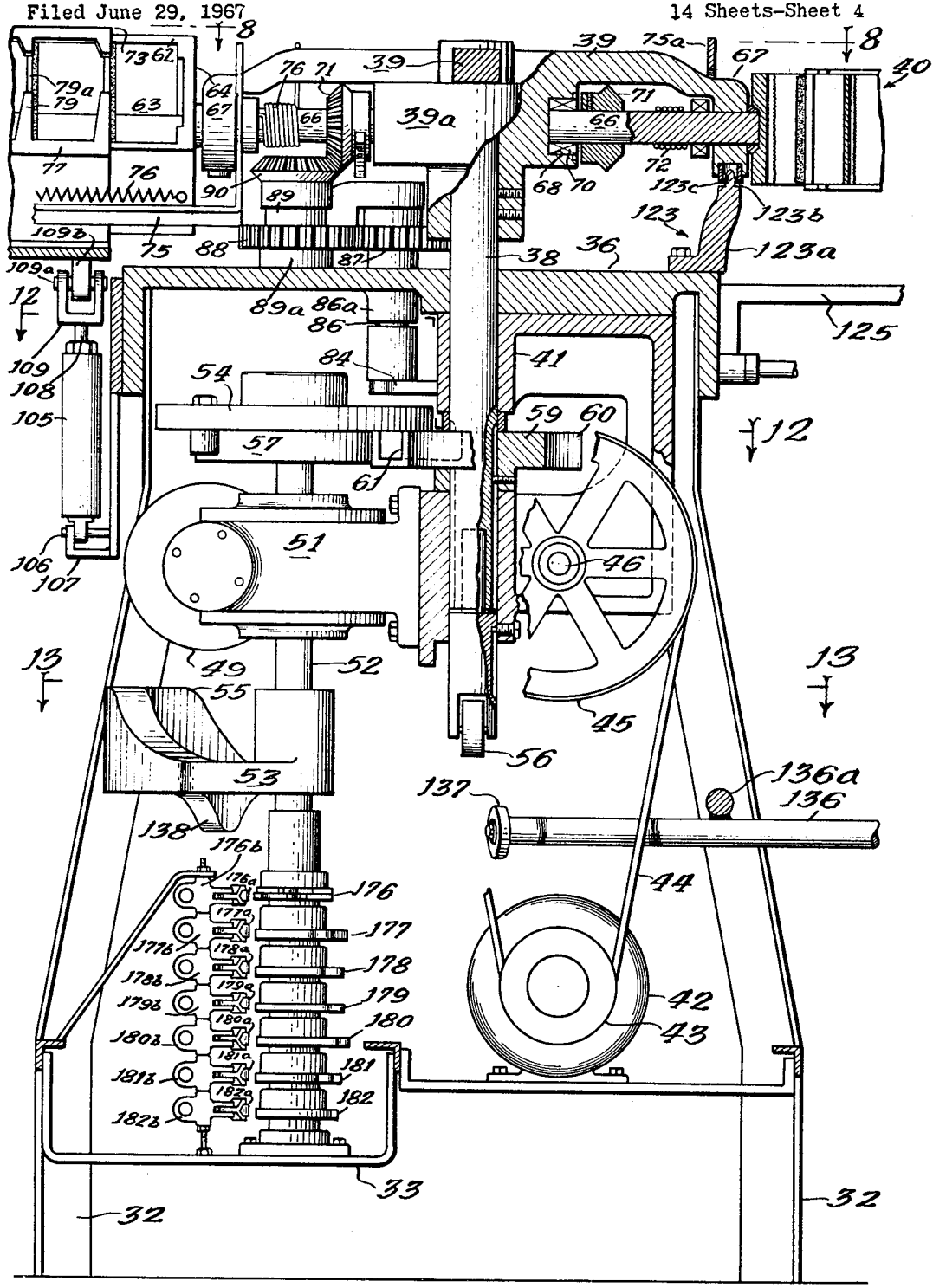
FIGURE 4 is a fragmentary enlarged section view taken generally along the line 4—4 of FIGURE 1 with parts removed for clarity of illustration, showing generally the main drive mechanism of the battery element fabricating machine of this invention.
Figure 14:
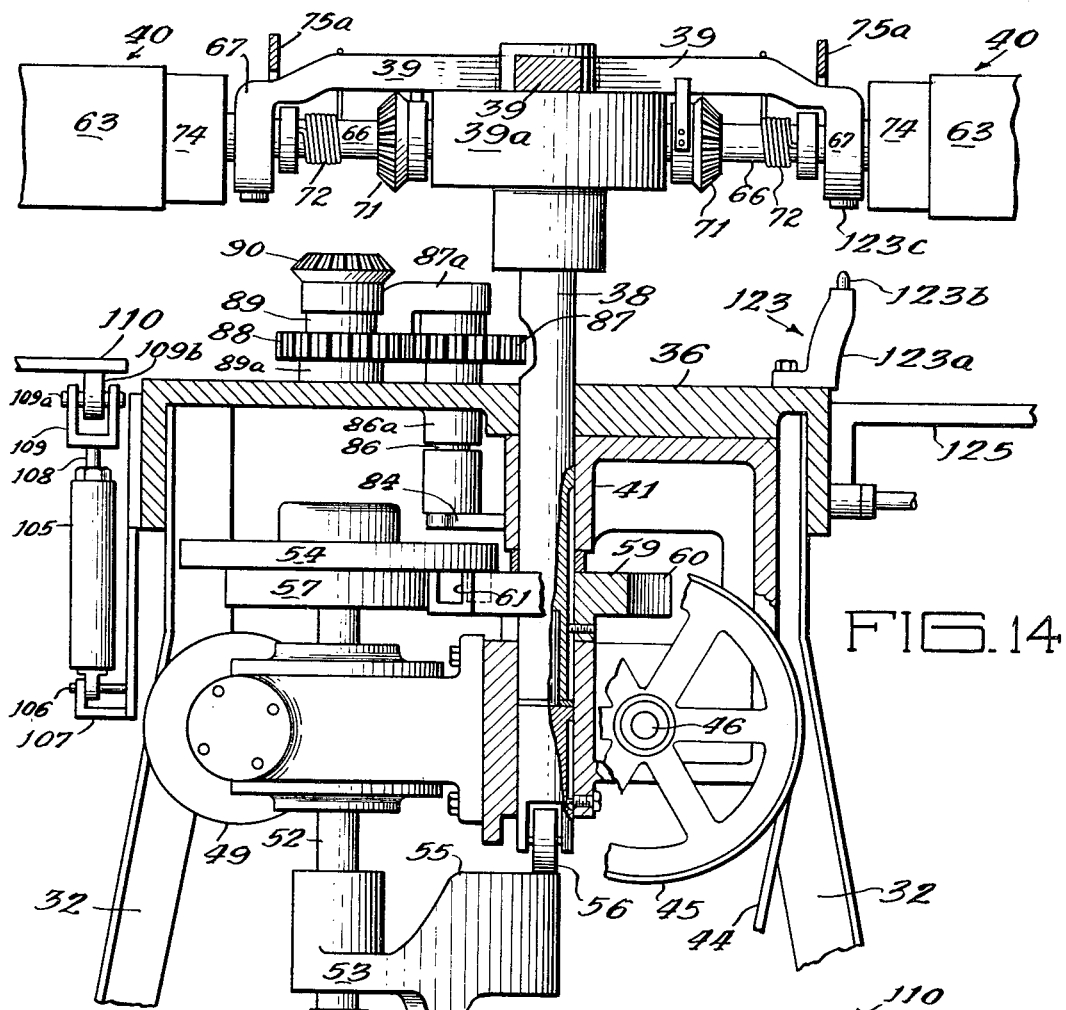
FIGURE 14 is a view similar to FIGURE 4 with parts removed for clarity of illustration but showing the relationship of the elements of the main drive mechanism when the column is in a raised position for rotating between stations.
Figure 15:
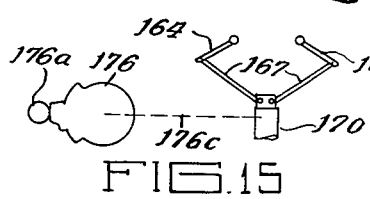
FIGURES 15 through 20 are diagrammatic view illustrating the relationships of specific cams associated with the main drive mechanism and the functional components which are operated as a result of the motion of the cams.

Vertical drive cam 53 and rotatable drive cam 54 are fixed on cam drive shaft 52. Vertical drive cam 53 has an upstanding eccentric surface 55 which is intended for engagement with a roller-like follower 56 on the lower end of shaft 38. As shaft 52 rotates and surface 55 comes into engagement with follower 56, the shaft 38 will intermittently move between a position of vertical retraction as shown in FIGURE 4 and full vertical extension as shown in FIGURE 14.

The rotatable drive cam 54 includes a generally arcuate or circular outer surface 57 which is interrupted by an inwardly extending radial recess 58 defined by surfaces 58a and 58b. A depending stud 58c is mounted in the area of recess 58. A follower 59 is fixed to the shaft 38 for rotating the shaft while permitting relative vertical movement thereof. Follower 39 includes four outwardly facing circular segmental arcuate surfaces 60 which are separated by four protruding portions 60a, each having an inwardly facing slot 61. The surfaces 60 on follower 59 and surfaces 57 on cam 54 are in a faceto-face sliding relationship with each other. After side 58a of the recess 58 passes a slot 61, stud 58c will engage therewith and rotate the follower for a portion of a revolution of the cam 54, while protrusion 60a extends into recess 58. This will rotate the follower 59 and column 38 to effectuate timed intermittent movement of the arms between the several stations relative to the vertical movement imparted by cam 53, the rotatable movement occurring when column 38 is in the raised position shown in FIGURE 14.

GROUP CARRIERS

As best seen in FIGURES 8 through 10 and 21 through 24, each of the carriers 40 includes an outwardly opening U-shaped member or box 62 comprised of parallel side walls 63 spanned by a rear wall 64. A plurality of partitions 65 with padded portions 65a extend transversely between the side walls 63 to generally define plate and separator confining areas or compartments normally of the order to hold a number of such plates and separators as will constitute a group. Preferably the distance between side walls 63 is slightly larger than the width of separators and plates to be carried, affording some latitude for ease of loading and unloading.

A shaft 66 extends rearwardly from the rear wall 64, generally in alignment with the arm 39, the shaft 66 providing a means for rotating the baskets about an axis relative to the arms 39. The shaft extends through a collar portion 67 in arm 39 and into a recess 68 in the hub 39a wherein it is rotatably mounted by suitable means, such as bearings 70. A miter gear 71 is fixed to the shaft 66 and a return spring 72 is connected to shaft 66 and the arm 39 to return the baskets 40 to a generally horizontal orientation after being rotated by driving means in engagement with gear 71 as will be explained later.

Further included in the carrier assembly is a telescopically related sleeve-like member 73 comprising a pair of side panels 74 joined together by a bridge member 75 of generally U-shaped configuration including a spanning portion 75a which arches over shaft 66. A spring 76 is fixed to panels 74 at 76a and to side walls 63 at 76b to normally urge the sleeve 73 and box 62 together in a retracted, plate-gripping position.

The side panels 74 include upper and lower inwardly extending flanges 77 and 78 which embrace the side walls 63. Plate gripping ribs 79 extend generally uprightly between the flange portions 77 and 78 and are movable toward and away from the partitions 65 in the box 62 as the sleeve member 73 is moved relative to the box, allowing the ribs to alternately grip plates and separators between the ribs 79 and the partitions 65 to thereby hold groups in the carrier, or to release the gripping engagement to permit the loading or unloading of groups from the basket. Ribs 79 also have pads 79a which, like pads 65a, are of a suitable resilient substance, such as sponge rubber or the like, to prevent damage to the plates when ribs 79 and partitions 65 are in a plate gripping relationship. A set of pads 65a and 79a are also spaced inwardly from one side wall of the group carrier to provide surfaces for accommodating narrower groups of plates and separators.

In the plan view FIGURE 1, the carriers 40 are shown as empty so that the relationship of the elements may be more easily understood. The ribs 79 are retracted from partitions 65 at the loading station to permit loading while the ribs are in plate gripping relation to the partitions at the fluxing and molding stations.

Means for rotating group carriers

Figure 2:
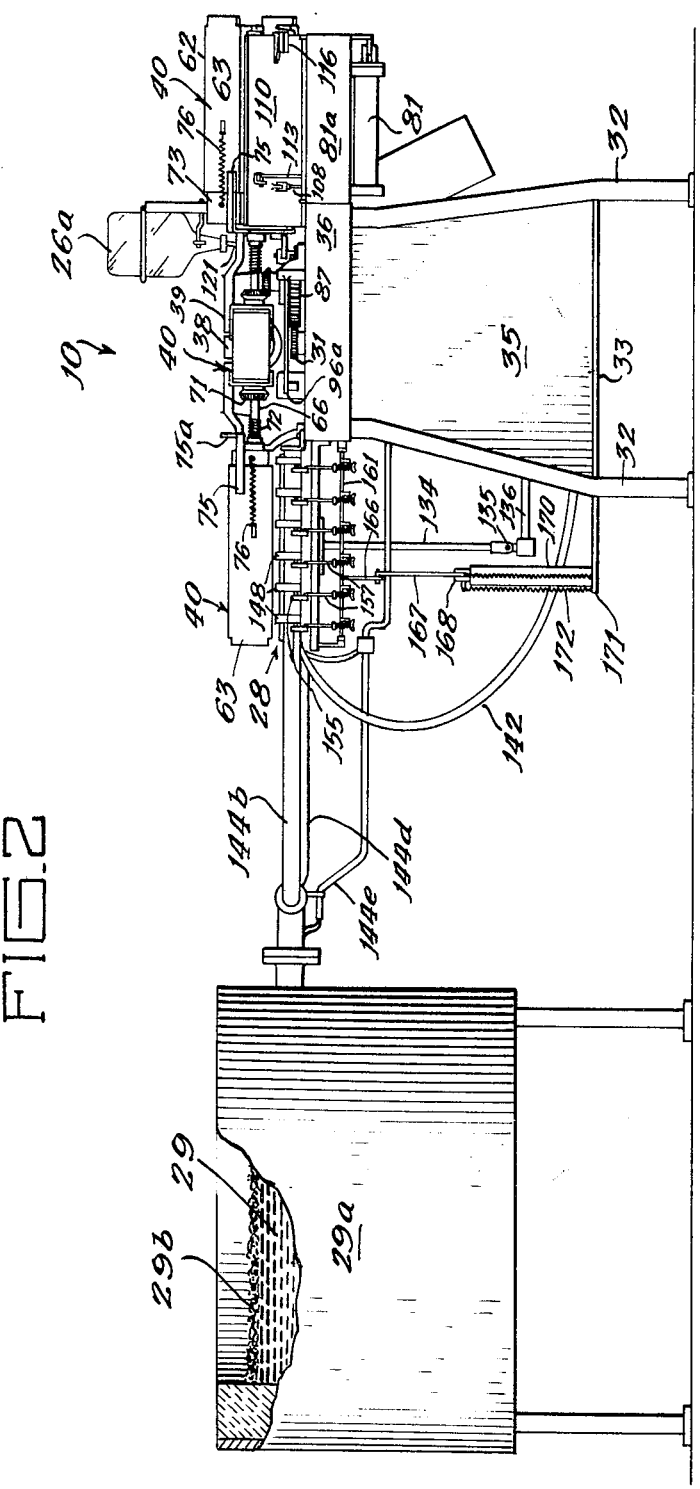
FIGURE 2 is a side elevational view of the battery element fabricating machine of this invention.

The means for rotating the carriers is shown in FIGURES 4, 5 8, 12, 14 through 21 and 22. Referring first to FIGURE 12, the means includes a cylinder 81 mounted under a bracket 81a (FIGURES 1 and 2). Preferably the cylinder is of the double acting type having the usual linearly extensible rod 82. The end of the rod is pivoted at 83 to a crank arm 84 which is connected at 85 to a shaft 86. Shaft 86 is rotatably mounted in a sleeve means 86a connected to the housing of the machine so that as the rod 82 is moved linearly with respect to the cylinder 81, the shaft 86 will be rotated thereby.

Turning now to the remaining aforementioned figures, a gear 87 is mounted on the shaft on the exterior of the housing top 36, the free end of the shaft 86 being rotatably journalled in an arm 87a which is fixed to the top 36. Gear 87 is in meshing engagement with a loading station gear 88 which is fixed to a shaft 89 rotatably mounted in a sleeve 89a on the top 36 of the housing. The free end of shaft 89 has a pinion 90 which is arranged for meshing engagement with gears 71 on each shaft 66 of each basket 40 when the carriers are lowered at the loading station.

Gear 87 is also in meshing engagement with the unloading station gear 91 which is fixed to sleeve 92a rotatably mounted about a stub 92 connected to the housing top 36. Sleeve 92a has a pinion 93 at the free end thereof which is also arranged for meshing engagement with the gear 71 on shaft 66 of each carrier 40 when the carriers are lowered at the unloading station. Loading station gear 88 is larger than unloading station gear 91 so that each revolution of gear 87 responsive to extension and retraction of rod 82 will cause greater revolution of the unloading station pinion 93 than will be effectuated at the loading station pinion 90. Therefore, carriers 40 at the loading station 24 will be rotated through a lesser degree of movement than those at unloading station 30. In the illustrated embodiment, the carriers 40 are rotated through 180° at the unloading station and 135° at the loading station.

Figure 8:
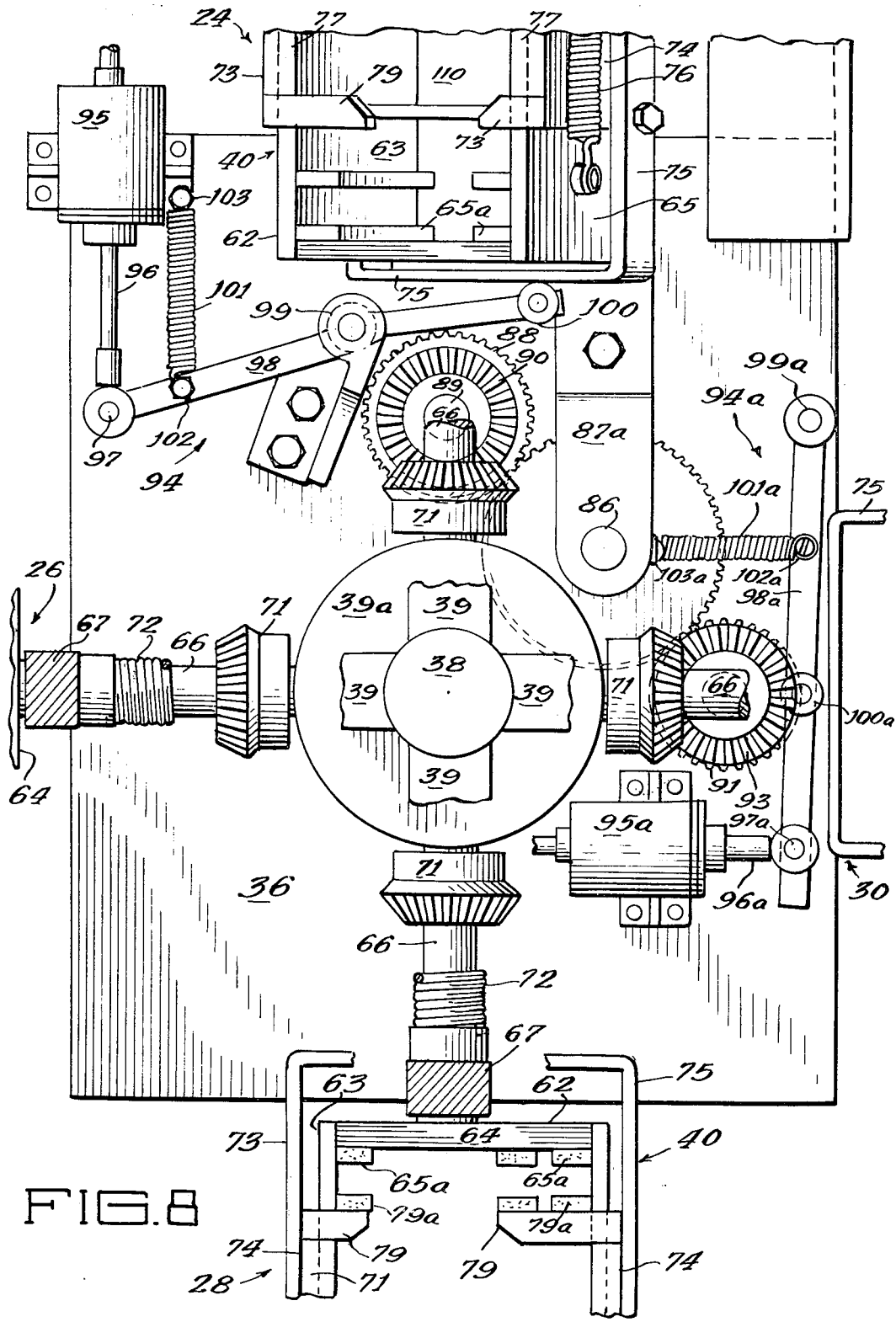
FIGURE 8 is a fragmentary enlarged section view taken generally along the line 8—8 of FIGURE 4.

Means for moving carriers between an open loading or dumping position and a closed plate holding position As best shown in FIGURES 8, 21 and 22, means are further provided for moving the carriers between an open position wherein plates and separators may be loaded or completed groups may be unloaded, and a closed position wherein loaded plates and separators may be held as groups during travel between the fluxing, molding, and unloading stations. The means for performing the function of causing relative movement between the sleeve 73 and box or U-shaped member 62 of the carrier 40 is generally designated 94 at the loading stations and 94a at the unloading stations.

Included in means 94 and 94a is a single acting cylinder 95 and 95a, respectively, each of which is fixed to the housing top 36. Each cylinder 95 and 95a has a linearly extensible rod 96 and 96a which is pivoted at 97 and 97a to an arm 98 and 98a, respectively. Each arm 98 and 98a is also pivoted at 99 and 99a, respectively, to the housing 36. A follower member 100 and 100a, preferably in the form of a roller, is mounted on each arm 98 and 98a, respectively. Return springs 101 and 101a are connected at 102 and 102a to each arm 98 and 98a, respectively, as well as being connected to means associated with the housing at 103 and 103a, respectively.

When the carriers 40 are in an upright or slightly angularly oriented position as shown in FIGURES 8 and 22, each bridge spanning portion 75a is adjacent follower 100 and 100a so that the carriers 40 are in a position to be acted upon by the means 94 and 94a. In particular, as each rod 96 and 96a extends outwardly from cylinder 95 and 95a, respectively, each follower 100 and 100a pushes the bridge spanning portion 75a of each carrier in opposition to the springs 76. This causes relative movement between the box 62 and sleeve 73 such as to cause the ribs 79 of sleeve 73 to move away from the partitions 65. This relative movement and the latitude affording the distance between side walls 63 provides ample room for plates and separators to be inserted in the carrier 40, or to permit free withdrawal of completed groups from the carrier. When the actuating force is released from each of cylinders 95 and 95a, the return springs 101 and 101a retract each rod 98 and 98a, respectively. At the same time, the return springs 76 on the carrier 40 cause relative movement between the boxes 62 and the sleeves 73 such as to move the ribs 79 toward the partitions 65 in a plate gripping position wherein the pads 65a and 79a will firmly squeeze the plates and separators together and hold the same against movement relative to the carrier 40.

Means for loading and alignment of plates

As best shown in FIGURES 9 and 11 and seen also partially in FIGURES 4 and 14, means are provided at the loading station 24 for permitting initial loading and simultaneous alignment of the several plates and separators into the carriers 40. Included in this means is a cylinder 105 which is pivoted by pin 106 to bracket 107 at its lower end. The cylinder includes the usual linearly extensible rod 108 provided with a yoke 109 at its free end. Mechanical return means, such as a return spring (not shown), is provided in the interior of cylinder 105. A pin 109a extends through yoke 109 and an eye 109b on the underside of swingable base member 110. While base 110 is shown as spanning the walls of the group carrier, it is to be understood that the base need only occupy a portion of the space between the walls to support the plates and separators during loading. A pin 111 is connected to a plate 111a which is movably mounted on the housing 36. Pin 111 provides a pivotal mounting for the base 110 to permit it to be swung from a position of retraction, as shown in FIGURE 10, to a position wherein the plate loading and alignment function can be performed, as shown in FIGURE 9.

For proper orientation of the lugs at the fluxing and casting stations, it is desirable to maintain the distance that the lugs extend above the group carriers a constant. To this end the location of base 110, when it is in the plate loading position, may be changed by moving plate 111a to move pin 111. Plate 111a is slotted at 111b and nuts 111c extend through the slots into housing 36. This connection provides a means for moving plate 111a, and also pin 111, laterally, to change the pivotal axis of base 110. Changing the pivotal axis of base 110 provides a means for adjusting the loading station to receive elements and separators of different height.

Base 110 is provided with a separator eye 112 on its underside to which curved arm 113 is connected. Arm 113 tracks through a guide 113a fastened on the side of housing 36. The opposite end of the arm 113 is provided with a stop means in the form of a nut 114 which provides a positive limit to the swinging movement of the base 110 responsive to actuation of cylinder 105 and the linear extension of rod 108.

At the start of a cycle, the carrier 40 which is located at the loading station 24 is angularly oriented about a 45° angle as shown in FIGURE 9. The cylinder 105 is actuated to swing the base member 110 in a position where it spans the bottom of the carrier 40. The several plates 12 and separators are loaded in the carrier, the means 94 having been actuated to sperad the ribs 79 away from the partitions 65 to allow sufficient space for easy positioning of the plates 12 and separators 17 in the carrier 40.

Preferably the plates are loaded with the lugs 22 facing upwardly, although this invention could be utilized in loading plates with the lugs facing downwardly. The angular orientation of the carriers at the loading station permits automatic aligning of the plates and separators by virtue of the fact that two surfaces of the plates 90° apart will be simultaneously abutting mating surfaces formed by the interior of the wall 63 of box 62 and the interior of the base 110. Distinct advantages result from loading the plates with the lugs up. The operator can visually inspect to determine that all of the plates have satisfactory lug structures and further that the lugs are properly oriented in their normal array through the assembly. The separators are initially flush with the bottom of the plates and do not have to be subsequently vibrated or otherwise displaced in the group.

It is intended that the plates and separators would be first loaded starting from the end wall 64 and working outwardly. A switch element 115 of switch 116 extends upwardly from the base member 110 and is positioned in the general area wherein the last group of plates and separators are to be inserted into the carrier. This switch is connected to the means for initiating the cyclic operation of the assembly machine thereby coordinating the automatic cycling of the machine with the speed of the individual operator or mechanism loading the plates and separators. Thus when the last group of plates and separators is loaded in the basket as shown in the position in FIGURE 9, the switch element 115 will be moved, causing the switch 116 to send a signal which will activate the drive means to drive the machine and move the column 38 and arms 39 through 90°. When this occurs, the cylinder 95 will be released, causing relative movement between sleeve 73 and box 62, so that the ribs 79 come into plate gripping relation with the partitions 65 to firmly hold the previously aligned plates and separators in the carrier 40. The cylinder 105 is then deactivated to return the rod 108, causing the base member 110 to be returned to the position shown in FIGURE 10. Next, cylinder 81 is actuated to rotate carrier 40 at the loading station so that the carrier will be oriented with the lugs facing downwardly. Following this, the column 38 is moved vertically upwardly, rotated 90°, and then retracted to move the carrier from the loading station to the fluxing station with the lugs 22 of the plates 12 facing downwardly in a fluxing position.

Referring to FIGURE 13, as column 38 approaches the end of 90° of rotation, finger 117 on cam 53 will strike switch arm 117a of switch 117b. This will cause switch 117b to send an appropriate signal for deactivating motor 42, such as by opening a relay (not shown).

FLUXING STATION

Figure 3:
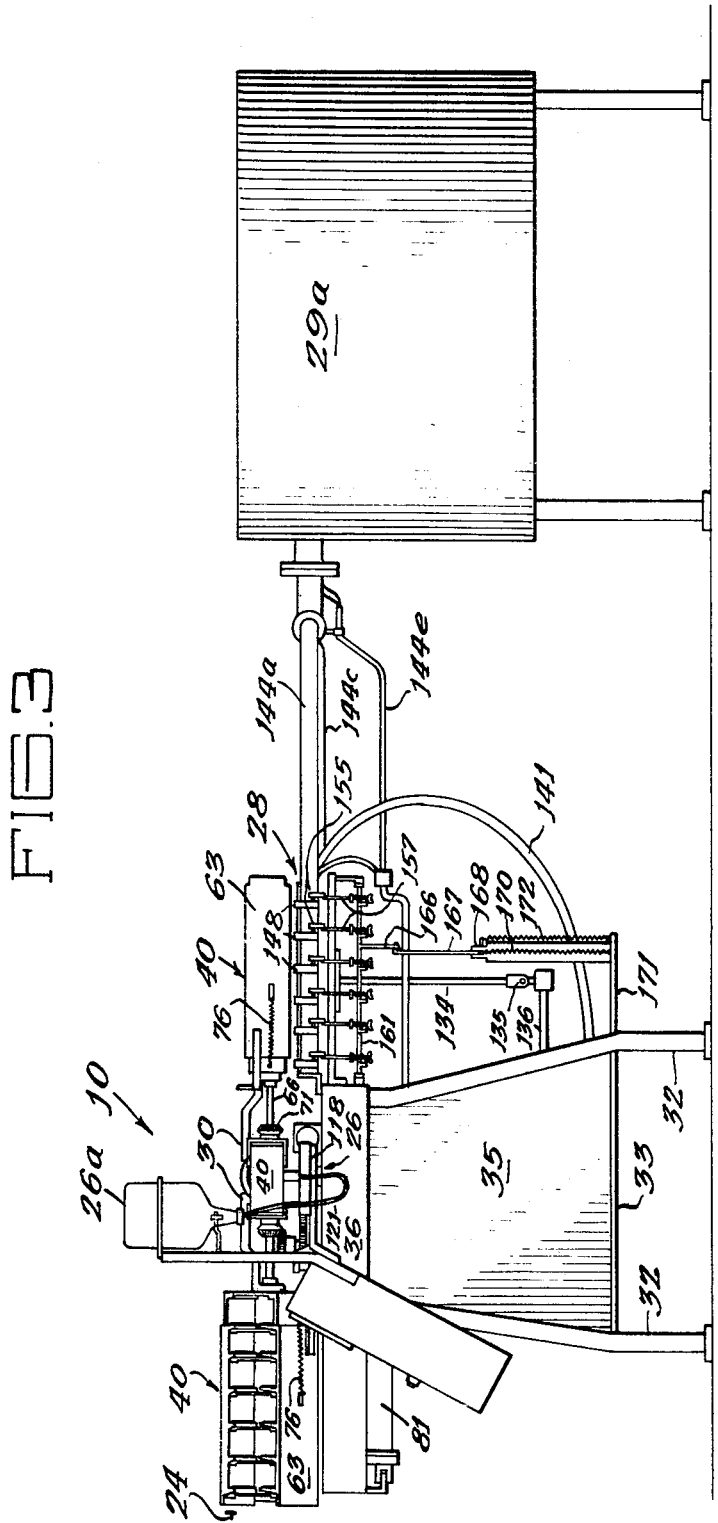
FIGURE 3 is a side elevational view of the battery element fabricating machine of this invention taken from the side opposite that shown in FIGURE 2.

As best seen in FIGURES 23 through 25, and also partially seen in FIGURES 1 and 3, the fluxing station 26 includes a generally radially outwardly extending tray 118. The tray 118 includes upwardly extending side walls 118a and 118b and an upwardly extending end member 118c. Flux applying means in the form of a pair of elongate sponges 119 are placed adjacent each side wall 118a and 118b to absorb fluxing solution 120. The fluxing solution is supplied from a line 121 which extends from the fluxing pot 26a and is dispensed into tray 118 through nozzle 122. As best seen in FIGURE 25, when the baskets 40 are at the fluxing station, the lugs 22 are pressed into the sponges 119 so that the fluxing solution is applied to the free ends of the lugs. This prepares the lugs for immersion in the molten lead at the casting station 28 upon successive movement of the carriers 40 to the next station. For fluxing narrower plates, additional sponges 119 could be placed adjacent each sponge 119 shown, or wider sponges (not shown) could be used.

The sponges are slightly higher than the intended level of the flux solution, providing a means for adequately fluxing lugs of different heights without dipping the lugs directly in the solution. In addition, the possibility of the separators being dipped into the flux solution is substantially eliminated.

CASTING OR MOLDING STATION

Referring initially to FIGURES 4 and 14, casting station 28 is provided with means 123 for registering the group carriers so that the lugs will be properly oriented with respect to mold cavities. Means 123 includes an upstanding member 123a on housing top 36 having a first registration element in the form of a pin or free end 123b. A hollow sleeve 123c is provided in the collar 67 of arm 39 and forms a second registration element for receiving pin 123 to register group carriers 40 as they are lowered at the casting station.

Figure 5:
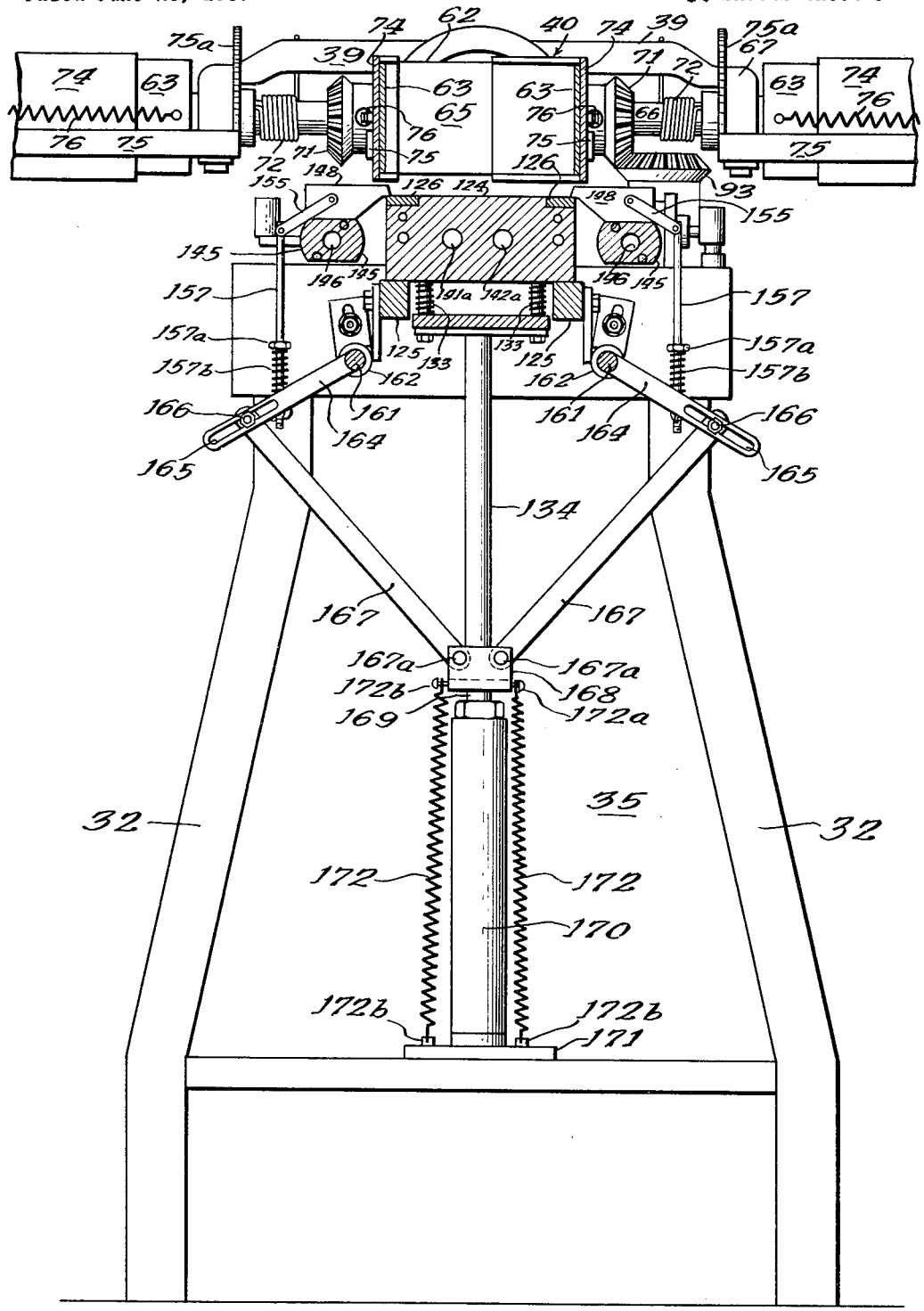
FIGURE 5 is a fragmentary enlarged section view taken generally along the line 5—5 of FIGURE 1 and showing a portion of the means for actuating the valve mechanism at the molding station.
Figure 6:
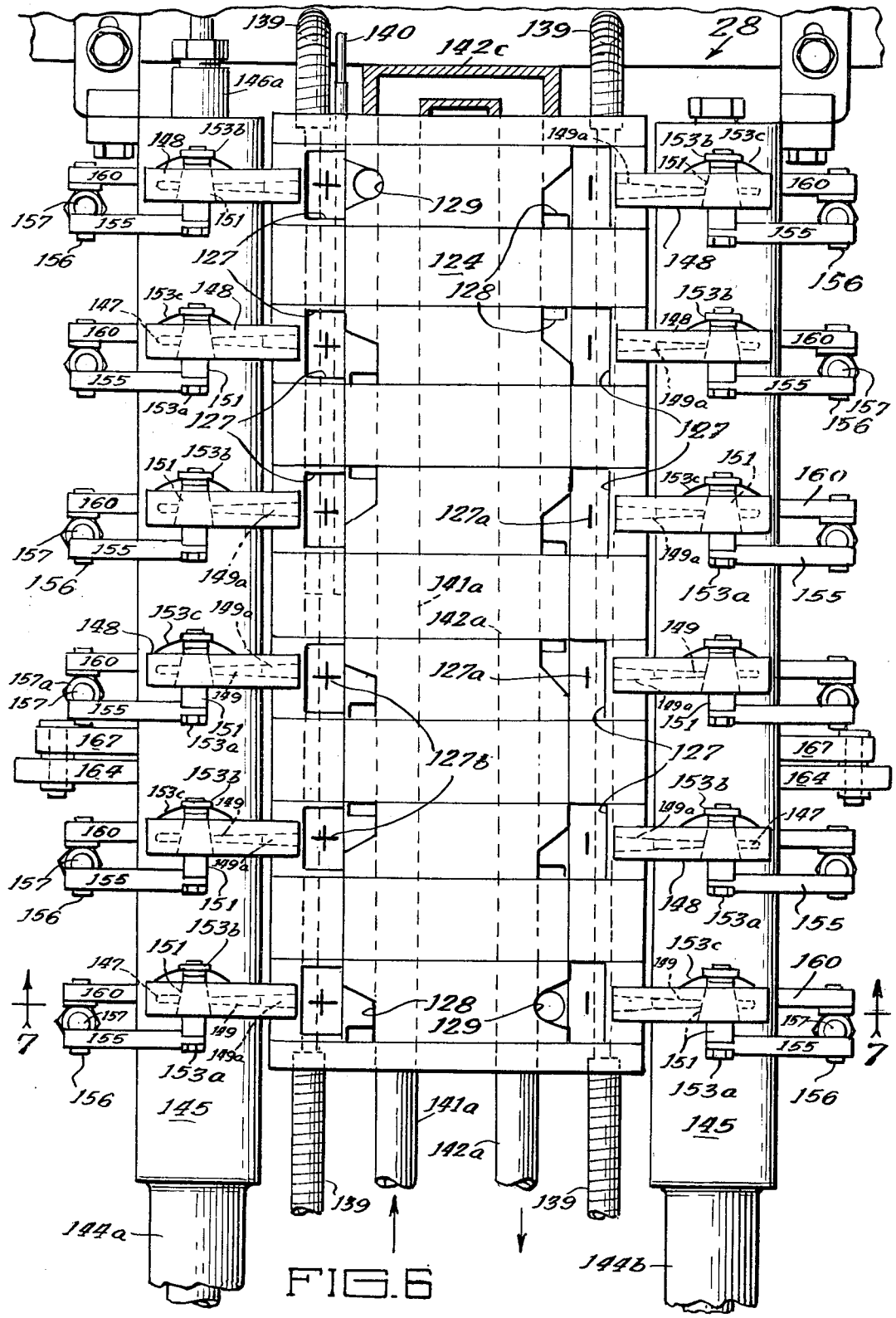
FIGURE 6 is a fragmentary enlarged top plan view of the molding station.
Figure 7:
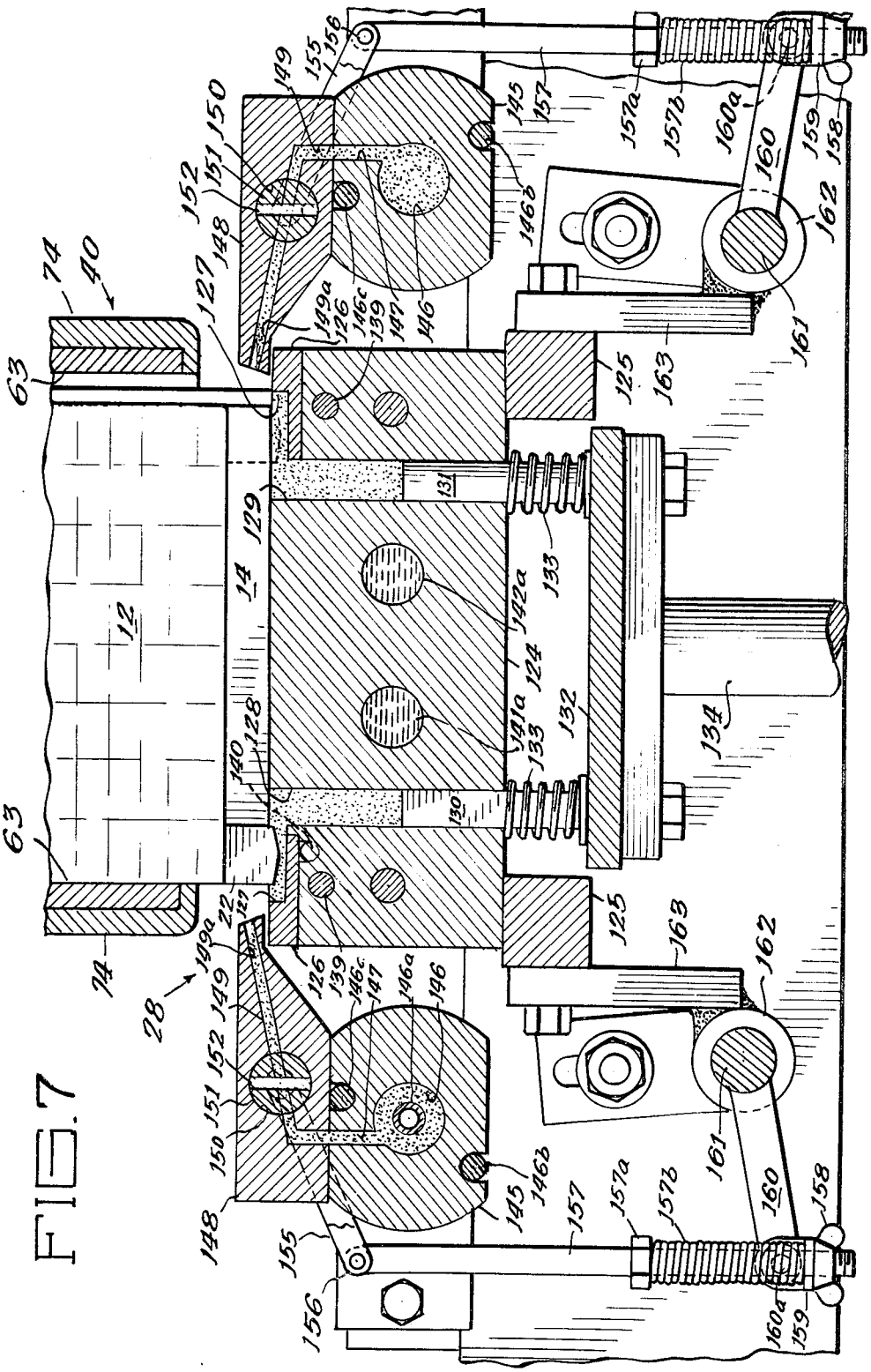
FIGURE 7 is a fragmentary enlarged section view taken generally along the line 7—7 of FIGURE 6 showing the valving arrangement of the molding station in greater detail.

As best seen in FIGURES 5 through 7, and as seen also to some extent in FIGURES 1 through 3, casting station 28 further includes a mold block 124 which is mounted on outwardly extending arms 125. Dams 126 are mounted at the top of the mold block 124, adjacent each side wall thereof. Dams 126 have recesses or cavities 127 for receiving the molten lead which will be cast as the strap portions 18 on the battery groups. The cavities 127 may be provided with a negative sign 127a or a positive sign 127b so that the finished cast strap will have the appropriate indicia thereon indicating to the battery assembler the proper manner in which the group should be assembled.

Post recesses 128 and 129 are provided in the mold block adjacent to, and in communication with, the strap cavities 127 so that the post portions 20 will be integrally cast with the straps 18. Post pushers 130 and 131 define the bottom of the cavities 128 and 129. These pushers are connected to a plate 132 with plate retraction means in the form of springs 133 between the bottom of the mold block 124 and the plate 132.

Turning momentarily to FIGURES 2 and 4, the plate 132 is supported on a rod 134 which is pivoted at 135 to an arm 136 which extends into the interior of the housing. Arm 136 is pivoted to the frame at 136a and is provided with a follower 137 on its free end in a position to be engaged by the depending cam surface 138 on cam 53.

As the cam shaft 52 rotates, the cam surface 138 will come in contact with follower 137 causing arm 136 to urge the rod 134, and therefore the post pushers 130 and 131, upwardly, which will have the effect of breaking the cast straps and posts outwardly from the mold in timed relationship to the lifting of the carrier 40 from the casting station preparatory to moving to the unloading station.

Returning to FIGURES 5 through 7, the mold block is provided with mold heaters 139 for initially heating the block to a sufficient temperature (preferably 375° F.) to maintain the lead molten as it is initially introduced to the casting station to control the rate of solidification of the lead until after the lugs have been dipped into the molten lead and the lug lead has melted to establish a bond upon cooling of the molten lead. After a period of time, heat transfer from the molten lead will maintain the casting station sufficiently warm and the heaters may reactivate. A mold temperature sensor 140 is also provided for sensing the temperature of the mold and cavities so that the heat thereof can be appropriately regulated. Water lines 141 and 142 circulate water through water conduits 141a and 142a in the central portion of the mold block 134 which are connected at one end by a U-shaped connection 142c. Water fed through conduits 141a and 142a cools the block and balances heat transfer of the molten lead to maintain the block at a desired temperature.

The lead is supplied from the vat 29a by conduits 144a and 144b which extend into manifolds 145 at opposite sides of the mold block 124. Each conduit 144a and 144b has a heater element 144c and 144d, respectively, which is connected to electrical lead 144e. Each manifold has a longitudinally extending bore 146 through which the lead flows, and a temperature sensing means 146a is maintained in at least one of the manifold bores for sensing the temperature of the lead. Heaters 146b and 146c are provided in the manifold preferably diametrically opposite bore 146 to maintain the molten lead at a high temperature such as 900° F. Ducts 147 lead from the bore 146 of each manifold 145 and are in communication with the valve blocks 148. Each valve block 148 is positioned adjacent a cavity 127 in each dam 126. In particular, the ducts 147 of the manifolds communicate with lead supplying valve passages 149 in each valve block 148. Valve passages 149 extend in a general upward inclination to the area adjacent the mold cavities.

A valve seat 150, preferably of a truncated frusto-conical shape, is provided in each valve block 148 intersecting the valve passage 149. A truncated frusto-conical cock 151 is seated in each seat 150. Cock 151 has a through passage 152 so that the valve passageway may be opened and closed by aligning the passage 152 of cock 151 with the passage 149 of block 148, or by rotating the same out of alignment therewith. When cock 151 is closed, molten lead remains in passage 149 on both sides of cock 151 to shield the cock. Preferably passage 152 is slightly smaller than valve passage 149. Also, preferably passage 149 terminates in an outwardly diverging spout-like end opening 149a (FIGURE 6).

By the described arrangement, molten lead 29 is fed from vat 29a through conduits 144a and 144b, manifolds 145 and valve blocks 148 to the mold cavities without exposure to air. Thus, the possibilities of abrasive oxides forming in the lead somewhere in the path of flow is substantially eliminated.

Opposite ends 153a and 153b of the cock extend outwardly from the valve block 148. End 153a is connected to a link 155 pivoted at 156 to a generally upright arm 157. End 153b is gripped by a spring washer 153c, preferably of inconel metal, to hold the cock 151 in seat 150. A nut 157a threaded on the arm abuts a spring 157b. A wing nut 158 threaded on the lower end of the arm holds a connector 159 which is pivoted to connecting arm 160 at 160a. Connector 159 also holds the spring 157b on the arm 157. Connecting arm 160 is secured to rod 161 at its opposite end, the rod 161 being rotatable in a sleeve 162 mounted on a bracket 163 which depends from each of the arms 125.

A master crank arm 164 is fixed to each of the rods 161. Arm 164 is provided with a slotted end and a nut and bolt connection 166 connects one of the scissors-like crank arms 167 to each of the arms 164. Arms 167 are connected at their opposite ends 167a to a clevis 168 which is fixed to the linearly extensible rod 169 of cylinder 170. Cylinder 170 is mounted on a bracket 171 which extends outwardly from the frame. Preferably cylinder 170 is of the single acting type and is therefore provided with return springs 172 connected to the clevis at 172a and to the bracket at 172b for returning or retracting the rod 169 after extension thereof.

Lead is supplied to the casting station in timed relation with the other cyclic operations of the machine by activation of the rod 169 which moves the arms 167 upwardly and outwardly to cause arms 164 to rotate rods 161. As rods 161 rotate, arms 160 will lift arms 157, causing the links 155 to rotate each cock 151 so that the passage 152 is in alignment with the valve passage 149 of each of the valve blocks 148. Lead flows from the manifold through passage 147 and passage 149 of the valve block into the cavities 127, 128 and 129 of the molding station.

After a predetermined length of time, the fluid supply to cylinder 170 is exhausted, and the return springs cause the rod 169 to retract, shutting off the flow of lead to the casting station. Simultaneous with the the cessation of the flow of lead, the lugs 22 of the plates are dipped into the molten lead as the plate holding baskets are brought to the casting station and descend thereat. After the plates are loaded at the loading station and the switch 116 activated, the cam surface 138 of cam 58 strikes the follower 137 of arm 136 which, in turn, causes the rod 134 to act upon the pushers 130 and 131 to push the post portions 128 and 129 upwardly at the same time that the plate holding basket 40 begins its upward movement to withdraw the cast post and straps from the casting station.

The post and slot connection between arms 164 and 167 provides a means for changing the degree of rotation of rod 161 responsive to actuation of the cylinder 170 so that the amount of lead supplied by all of the valves 148 may be adjusted accordingly. In addition, dispensation of lead from each of the valves 148 is individually adjustable by means of the nut and spring arrangements 157a and 157b and 158.

Spacer 173 is interposed between conduits 144a and 144b. When it is desired to cast narrow groups of plates and separators, spacer 173 is removed and a narrower mold block 124 is mounted on arms 125. Alignment may be accomplished at all times along the side of the mold to which conduit 144a extends.

The passage 149 is preferably slightly larger than opening 152 through the cock 151 to minimize the effect of any build up of lead oxides in the passageway. As a result, lead is actually metered by the size of the opening 152 in the cock 151. Fluid passage 149 is slightly upwardly inclined so that lead will not drain out the valve passage after the cock 151 is moved to the closed position. This affords a more precise metering of the lead by the valve. Preferably the volume of passages 147 and 149 is related to the volume of the cavities 128 and 129 so that the amount of lead in passage 147 and 149 will not quite fill cavities 128 and 129. Lead which remains in passages 147 and 149 is slightly cooler than the lead which is in the bore 146 of the manifold. By the volumetric relationship mentioned, the coolest lead will go to the post cavity and the hottest lead from the manifold lines will go into the strap cavity. This is most desirable in that the breakdown of lead oxide and melting of the lead of the lugs 22 is more efficiently accomplished by the hotter lead.

In the preferred embodiment, the manifold bore 146 is about ¾″ in diameter, the manifold duct 147 is about $7/_{32}$″ in diameter, the cock through passage 152 is about $3/_{16}$″ in diameter, and valve passage 149 is about $7/_{32}$″ in diameter. The spout-like opening 149a is formed in about the last ½″ of passage 149 and is about $7/_{32}$″ high and ⅜″ wide.

The oblate configuration of the spout end 149a acts to spread the flow of lead from the valve block. This prevents the possibility of lead squirting outwardly and overshooting its intended destination in the cavities 127 and 128 or 129. In addition this enlarged area reduces the pressure of the lead flow so that the lead runs partly over the dam to preheat the sides of the cavity 127 prior to the continuation of the lead into the post cavities.

Cock 151 is made of a suitable hard metal, such as steel, which is then heat treated and subsequently surface treated by exopsure to nitride gas. One of the problems in supplying molten lead through a valving arrangement has been that of the galling and sticking of valve components as a result of the amounts of the extreme high temperatures to which the components are subjected. Frequently the molten lead is at a temperature of 900° F. to 950° F. in the vale block. Previous efforts to design suitable valves have been unsuccessful due to these high temperatures and the presence of lead oxide which may build up on the valve elements during use. It has been found that by forming the cock as mentioned, and then heat treating and surface treating the same with nitride gas, the problems of galling and sticking are eliminated with the result that the valve arrangement disclosed herein operates continuously to supply accurate amounts of lead to the cavities.

UNLOADING STATION

The unloading station 30 includes the previously described means for rotating the group carriers. When the carriers arrive at the unloading station, they are in the inverted position as shown in FIGURE 21, with the lugs and straps pointing downwardly. The central column 38 then descends vertically so that the gears 71 and 93 mesh. Actuation of the cylinder 81 causes the carriers to be rotated 180°, by virtue of the engagement between the gear 87 and the gear 91, so that the lugs and straps point upwardly. Means 94a is then actuated to place the carriers in an open or dumping condition, as shown in dotted outline in FIGURE 22, with the follower 100a engaging the bridge spanning portion 75a to push the sleeve member 73 relative to the box 62. At this point, the completed groups fall by gravity on the shelf 30a which is preferably supported by resilient means, such as springs 174, positioned over supporting columns 175. It is to be noted that other suitable means for receiving the unloaded groups could be provided, such as a conveyor belt, so that the completed groups could be automatically carried away from the unloading station 30 after being dropped from the carriers 40.

CONTROL OF FUNCTIONAL COMPONENTS

Referring now to FIGURES 4 and 15 through 20, the several functional systems described herein are operated off the rotational motion of shaft 52 by movement of cams 176 through 182 and the engagement of followers 176a through 182a, respectively, therewith, said followers being operatively connected to appropriate signal sending means 176b through 182b, respectively.

Cam 176 activates the cylinder 170 to initiate the supply of molten lead to the casting station. The cam 176 engages follower 176a which causes means 176b to send an appropriate signal through conduit means 176c for activating the cylinder 170 which, in turn, moves the arms 167 and 164 as previously described, thereby causing molten lead to be supplied to the casting station.

Cam 177 controls the operation of the cylinder 81 for rotating carriers 40 about their axes. Cam 177 engages a follower 176a which causes means 177b to send a signal through conduit 177c to activate the cylinder 81. This will extend rod 82 which, through the connection of rod 84 on shaft 86, will cause rotation of gear 87. This, in turn, will cause gears 90 and 93 to engage gears 71, thereby rotating the carriers 40 about their axes.

Cam 178 controls the dump out of the completed battery groups at the unloading stations 30. This cam engages a follower 178a which causes means 178b to send a signal through conduit 178c to the cylinder 95a. Extension of rod 96a moves follower 100a into engagement with bridge spanning portion 75a which, in turn, will urge the sleeve member 73 away from the box 62 and permit the completed group 16 to drop from the carriers 40.

Cam 180 controls the operation of the base 110 provided at the loading station to permit initial loading and alignment of the plates in the basket assembly 40. Cam 180 urges a follower 180a which causes the means 180b to send a signal through conduit 180c to activate the cylinder 105. Activation of the cylinder extends rod 108, forcing the base member 110 about its pivot 111 against the underside of the carrier 40 at the loading station to permit loading and alignment of the plates and separators.

Figure 18:
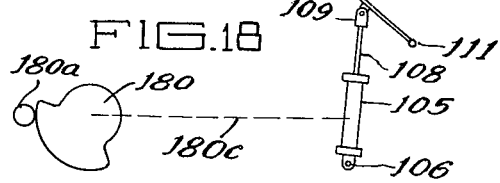
Figure 16:
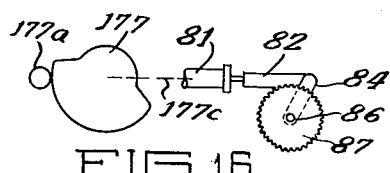
Figure 19:
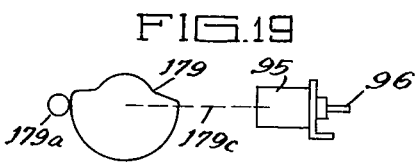
Figure 17:
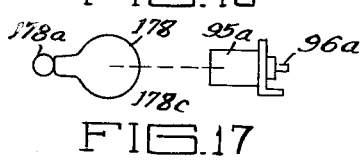

Cam 179 controls the operation of cylinder 95. This cam engages a follower 179a to cause means 179b to send a signal through the conduit 179c to the cylinder 95 to extend rod 96. Rod 96 urges the follower 100 against the bridge spanning portion 75a of the carrier 40 at the loading station to urge the sleeve-like member 73 apart relative to the box 62 or, in other words, to condition the carrier 40 for reception of the plates and separators at the same time that the base 110 is swung into position as shown in FIGURE 18.

Figure 20:
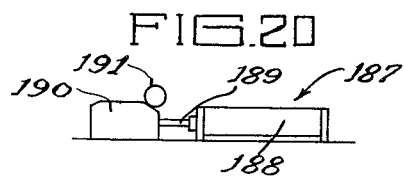

Reset timing means 187 is shown in FIGURES 13 and 20. Means 187 includes a cylinder 188 having a linearly extensible rod 189 with cam 190 mounted on the free end of rod 189. A follower 191 is mounted in the machine in the path of travel of cam 190 and is connected to means for controlling cylinders 95a and 170. If it is desired to take one carrier through a cycle without casting, cylinder 188 may be actuated by suitable switch means on the outstroke. As cam 190 engages follower 191, that follower will actuate means for eliminating the signal for actuating cylinder 170 so no lead will be poured at the casting station. As the rod 189 returns and follower 191 is again engaged, the follower will actuate means for eliminating the signal for actuating cylinder 95a and thus the uncast plates and separators will not be dumped at the unloading station.

SUMMARY OF OPERATION

The operation of the machine can best be understood by beginning with the description of the components thereof near the termination of each quarter cycle. At the loading station, the carriers 40 are pivoted through 135° so that they assume a 45° angle, and base 110 is pivoted under the carriers, thereby forming a basket for the reception of plates and separators. The carriers at the dumping station are pivoted 90° to orient the groups with the post and strap facing upwardly. Also, cylinder 95 is activated at the loading station so that the follower 100 "opens" the carrier 40 to permit the loading of the plates. At the same time, the cylinder 95a is momentarily activated to "open" carrier 40 at the unloading station to permit the dumping of the completed groups. Following this, the machine is deactivated following the tripping of the switch 117b by finger 117 on cam 53.

As the last group of plates is loaded in the basket 40 at the loading station, the switch 116 is activated and the cam 53 begins turning. Cylinders 95 and 105 are deactivated, causing the groups to be gripped in the carrier 40 at the loading station, and the base 110 to swing out of the loading position into the retracted position as shown in FIGURE 10. Cylinder 82 is also operated, reversing the gear 87 and rotating the carriers so that the carrier which was previously at the loading station oriented at a 45° angle, will be rotated 135° about its axis to orient the lugs downwardly preparatory to being moved to the fluxing station; and the carrier 40 at the unloading station will be rotated 90° about its axis preparatory to movement to the loading station.

Next, the surface 55 on cam 53 approaches the follower 56 and raises column 38. Cam 54 then engages with follower 59 to rotate the shaft 38 through 90° so that each of the carriers 40 is moved from the position above one of the stations to a position above the next station. Upon disengagement between cam 54 and follower 59 so that surfaces 57 and 60 slide relative to each other, the carriers are in position over one of the stations and the follower 56 begins tracking down on the trailing edge of the cam surface 55. Thus carrier 40 which was previously at the loading station wherein the plates were loading with the lugs facing upwardly is now placed at the fluxing station with the lugs facing downwardly. At the fluxing station, the plate lugs are pressed into sponges to apply flux to the free ends of the lugs. At the same time, the carrier 40 which was previously at the unloading station is now at the loading station with the base member 110 closing the bottom thereof, the carrier oriented at a 45° angle with the horizontal, and "opened" in a position to receive the next load of plates. The machine is deactivated by tripping of switch 117b and goes through a dwell period until the switch 116 on the base 110 is again activated by the loading of the last group of plates, whereupon another one quarter of the cycle of the operation of the machine is initiated.

While the carrier is lifted from the fluxing station and carried to the casting station, the cylinder 170 is activated to feed molten lead to the cavities at the casting station. The lead is fed continuously in a predetermined amount until just pror to the time that the lugs dip into the cavities. At that point, the exact amount of molten lead necessary to form the desired straps and posts is fed to the cavities and the cylinder 170 is deactivated so that the return springs cause the related arms to pivot the cocks and thereby terminate the supply of lead. The lugs, facing downwardly, are dipped into the molten lead at the casting station. Again, the machine is deactivated and goes through a dwell period until the switch 116 is again activated.

As switch 116 is activated and the cam 53 begins to rotate, the cam surface 138 on the underside of the cam will strike the follower 137 on arm 136 which, as previously described, causes the post pushers 130 and 131 to push the post portions 128 and 129 cast on the battery lugs upwardly from the molding station. At the same time, the follower 56 begins its upward travel on the cam surface 55 so that the column 38 raises, lifting the carriers 40 at the several stations. Again the mechanism goes through the one quarter cycle so that the carriers 40 are fed to the next successive station, the column retracted, and the carriers lowered thereby. The carrier 40 which was initially at the loading station has now arrived at the unloading station. Operation of gear 87 by cylinder 81 causes the carrier 40 at the unloading station to be rotated 90° with the cast post and straps facing upwardly. Cylinder 95a is then momentarily activated to "open" the carrier and permit the dumping of the completed groups.

The battery assembly machine disclosed herein possesses several unique advantages over those previously known. The plates may be initially loaded at the loading station with the lugs facing upwardly to permit rapid visual inspection and eliminate the need for subsequent movement of the separators. The act of loading the plates also insures the alignment thereof because the carrier in the plate loading position is angularly oriented relative to the horizontal so that the two surfaces of the plates bear against corresponding surfaces at the loading station.

At the fluxing station, only a flux is applied to the lugs and there is no necessity for separate heating equipment for either the flux or the lugs. By means of the novel valving arrangement disclosed herein, the precise metered amount of lead is fed directly into the cavities at the molding station eliminating the need for separate dipper pots or the like. As a result, no time is lost at the casting station while waiting for the dipper pot or the like to move toward and away from the cavities.

Thus, the machine is capable of simultaneous loading, fluxing, casting and unloading during each quarter cycle of the machine which is initiated by the act of loading the last group of plates and separators. It has been found that the machine built according to this disclosure is capable of producing 800 to 1,000 completed groups in a normal working day, whereas the fastest machine known to the applicant for accomplishing the same purpose is capable of producing about 400 completed groups during the same period of time.

The foregoing detailed description has been given for clearness of understanding only, and no unnecessary limitations should be understood therefrom, as some modifications may be obvious to those skilled in the art.

I claim:

1. A machine for fabricating storage battery elements, comprising: a frame; means on the frame defining a loading station, a fluxing station, a casting station, and an unloading station; an upright column mounted on the frame for vertical movement and for rotational movement; driving means for moving the column vertically and for rotating the column; and a plurality of storage battery element carriers carried by and spaced radially of said column for vertical and rotational movement with the column into and out of said stations.

2. The battery fabricating machine of claim 1 wherein a plurality of arms are connected to the column and extend radially outwardly therefrom, and a carrier is rotatably mounted on each arm for relative rotation about the axis of each arm.

3. The battery fabricating machine of claim 2 wherein means are provided at the loading station and the unloading station for rotating the carriers about their axes.

4. The battery fabricating machine of claim 2 wherein the carriers include relatively moveable element gripping components and means are provided at the loading and unloading stations for moving said relatively movable gripping components.

5. The battery fabricating machine of claim 4 wherein the means for moving the gripping components is associated with the column drive means so as to be actuated, in relationship to the carrier rotating means, to move the gripping components when the rotating means moves said carriers away from said battery element processing position at said loading and unloading stations.

6. The battery fabricating machine of claim 1 wherein the carriers include gripping members for holding battery elements in the carriers, the gripping members being relatively moveable with respect to each other from a gripping position to an open position whereby elements may be loaded or unloaded from the carriers.

7. The battery fabricating machine of claim 6 wherein means are provided at the loading and unloading station for moving the carrier gripping members to the open position.

8. A machine for fabricating storage battery elements composed of separators interposed between plates provided with projecting lugs, comprising: a frame; means on the frame defining a loading station, a fluxing station, a casting station, and an unloading station; a column positioned generally centrally of the frame and mounted therein for vertical movement and for rotational movement, vertical movement of the column raising and lowering battery elements at the respective stations, and rotional movement of the column moving the elements between the respective stations; means for driving the column; a plurality of arms extending radially outwardly from said column; and element holding carriers extending radially outwardly from each of the arms, said carriers including gripping members movable between a holding position wherein elements are held in the carriers, and a carrier open position wherein elements may be withdrawn or loaded relative to the carriers; means at the loading and unloading station for rotating the carriers so that elements may be loaded and unloaded with batttery plate lugs facing in one direction, and fluxed and cast with the lugs facing in another direction; and means at the loading and unloading station for moving the gripping members of the carriers for withdrawal of the elements at the unloading station and loading of the elements at the loading station.

9. The battery fabricating machine of claim 8 wherein said means provided at the loading and unloading station for moving the gripping members to open the carriers is operable when the carriers are rotated to place the lugs in said one position.

10. The battery fabricating machine of claim 9 wherein movement of the central column simultaneously moves all the holding carriers so that loading, fluxing, casting and unloading are simultaneously performed.

11. The battery fabricating machine of claim 10 including means at the loading station for actuating the central column drive means, said column drive means having portions for axially moving the column to withdraw each carrier from a respective station, portions for rotating the column so that each carrier advances to a position adjacent the next station, and portions for axially reversely moving the column to place the carrier in functional positions at each of the stations and hold the same thereat until reactivation of the drive means by the signal means at the loading station responsive to the loading of the next successive full complement of plates thereat.

12. The battery fabricating machine of claim 11 wherein the casting station is provided with cavities defining posts and straps for the battery plates and wherein pusher means are provided at the casting station for pushing on the cast post and strap portions after the same have hardened and fused on the lugs, said pusher means being driven by means in timed relation to said means for driving said central column so that said pusher means acts on the cast post and straps of the plates at the casting station simultaneously with the action of the column in axially withdrawing the carriers from the several stations.

13. The battery fabricating machine of claim 1 wherein the upright column is movable between a retracted position wherein the battery element carriers are located at a functional position in each of the loading, fluxing, casting and unloading stations; and an extended position wherein the battery element carriers are moved away from the functional position at each of said stations.

14. The battery fabricating machine of claim 13 wherein the means for driving the column is operably associated therewith to rotate the column only when the column is moved away from the retracted position.

15. The battery fabricating machine of claim 14 wherein the carriers are normally position on the arms in a battery element processing position and are rotatable away from said position.

16. The battery fabricating machine of claim 15 wherein the carriers are associated with the arms by means normally urging the carriers to said battery element processing position.

17. The battery fabricating machine of claim 16 wherein the means for rotating the carriers away from the battery element processing position includes a drive member on the frame and a driven member on each carrier engageable with said drive member.

18. The battery fabricating machine of claim 17 wherein the frame drive member includes a master drive member and intermediate drive members in engagement with the said master drive member, said intermediate drive members being provided at each of the loading and unloading stations for engagement with the carrier thereat.

19. The battery fabricating machine of claim 18 wherein the intermediate drive members and carrier driven members are engageable when the column is in the retracted position.

20. The battery fabricating machine of claim 19 wherein means is provided for driving the master drive member, said master drive member being operably associated with the column driving means for operating the master drive member only when said column is in said retracted position.

21. The battery fabricating machine of claim 1 wherein first registration means is provided adjacent the casting station and wherein each of the arms is provided with second registration means engageable with said first registration means for registering the carriers at said casting stations.

References Cited

UNITED STATES PATENTS

| | | | |
|---|---|---|---|
| 1,561,780 | 11/1925 | Engel | 164—260 |
| 1,816,059 | 7/1931 | Smith | 164—267 |
| 2,502,373 | 3/1950 | Galloway | 164—109 X |
| 2,799,905 | 7/1957 | Vieth | 164—260 |
| 2,978,762 | 4/1961 | McAlpine | 164—109 |
| 3,229,339 | 1/1966 | Sabatino et al. | 164—102 |
| 3,253,306 | 5/1966 | Sabatino et al. | 164—102 X |
| 3,395,748 | 8/1968 | Tiegel | 164—102 X |

WILLIAM J. STEPHENSON, Primary Examiner

R. S. ANNEAR, Assistant Examiner

U.S. Cl. X.R.

164—102, 334